US007003141B1

United States Patent
Lichtermann et al.

(10) Patent No.: US 7,003,141 B1
(45) Date of Patent: Feb. 21, 2006

(54) METHOD OF AND DEVICE FOR IDENTIFICATION OF FINGERMARKS

(75) Inventors: Jan Lichtermann, Vaihingen-Ensingen (DE); Mario Kroeninger, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 504 days.

(21) Appl. No.: 09/884,838

(22) Filed: Jun. 19, 2001

(30) Foreign Application Priority Data

Jun. 21, 2000 (DE) ............................... 100 30 404

(51) Int. Cl.
*G06K 9/00* (2006.01)
(52) U.S. Cl. .................. 382/124; 356/71; 340/5.83; 902/3
(58) Field of Classification Search .............. 382/115, 382/124–127, 209, 224; 340/5.53, 5.83
See application file for complete search history.

(56) References Cited

U.S. PATENT DOCUMENTS

| 4,956,870 | A |   | 9/1990  | Hara                    |
|-----------|---|---|---------|-------------------------|
| 5,067,162 | A | * | 11/1991 | Driscoll et al. 382/126 |
| 5,926,555 | A | * | 7/1999  | Ort et al. 382/124      |
| 5,953,442 | A | * | 9/1999  | Dydyk et al. 382/125    |
| 2002/0034322 | A1 |   | 3/2002 | Lichtermann et al.   |

FOREIGN PATENT DOCUMENTS

| WO | 93/07584 | 4/1993 |
| WO | 99/05637 | 2/1999 |

OTHER PUBLICATIONS

Nalini K. Rahta, et al: "A Real-Time Matching System for Large . . . " IEEE Transactions on Pattern and Abalysis and Machine Intelligence, vol. 18, No. 8, Aug. 1996., pp. 799-813.
V.A. Soifer et al: "FingerPrint Identification Using the . . . ", IEEE Proceedings, 1996, pp. 586-590.

* cited by examiner

*Primary Examiner*—Samir Ahmed
*Assistant Examiner*—Charles Kim
(74) *Attorney, Agent, or Firm*—Michael J. Striker

(57) ABSTRACT

Identification of a fingermark is performed by obtaining for a fingermark a fingermark image, storing reference fingermarks in a databank, comparing the obtained fingermark image with the reference fingermarks for identification, before the identification determining for each reference fingermark in comparison with the obtained fingermark image a similarity degree, sorting the reference fingermarks in the databank in accordance with the similarity degree, and performing the identification of the fingermark beginning with the reference fingermark which leads to the greatest similarity degree.

6 Claims, 2 Drawing Sheets

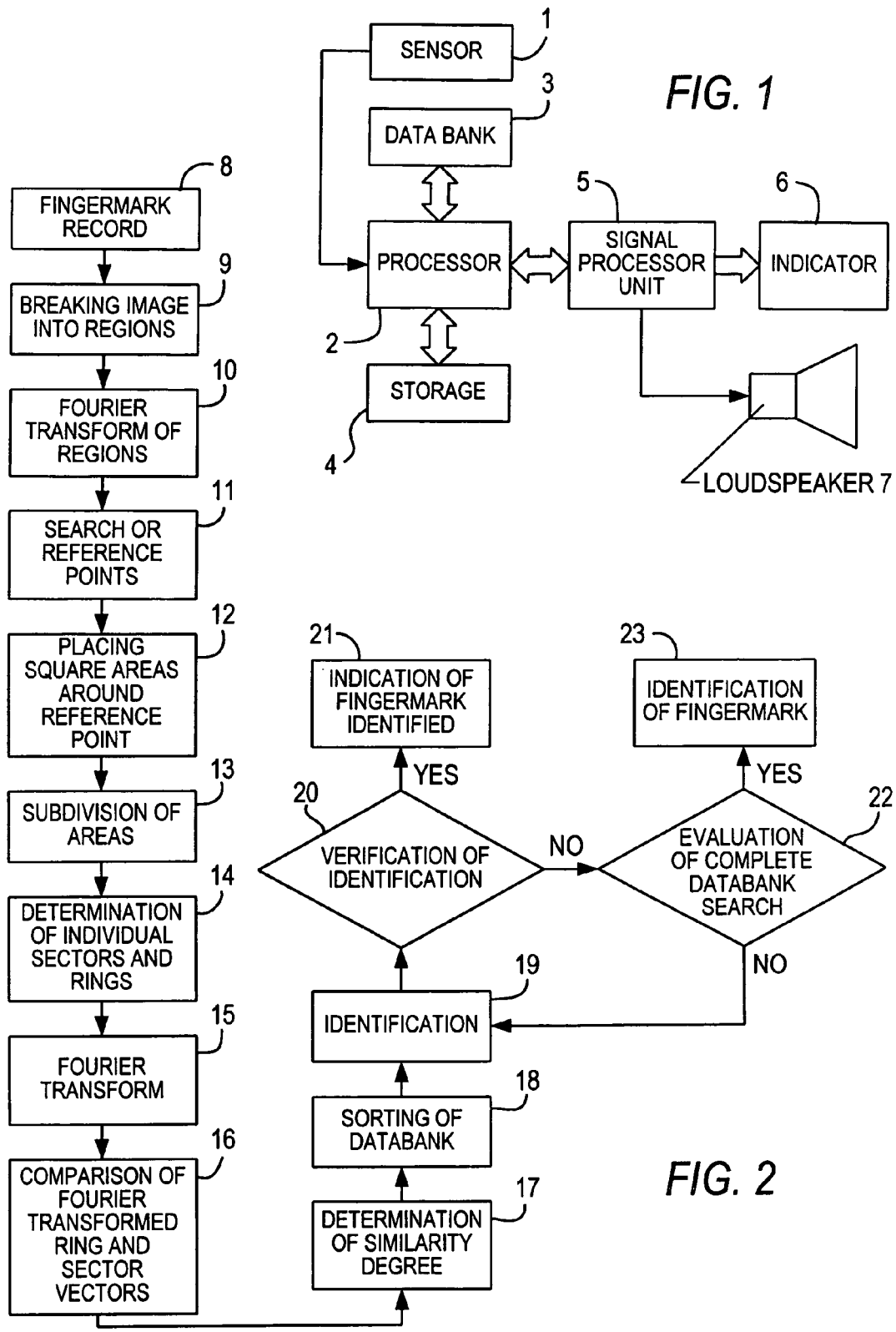

METHOD OF AND DEVICE FOR IDENTIFICATION OF FINGERMARKS

BACKGROUND OF THE INVENTION

The present invention relates to a method for identification of a fingermark, and a device for identification of a fingermark.

The patent document WO99/05637 discloses a method and a device for placing an unknown finger mark in a category. The analysis is performed in a spatial frequency region. The image of the fingermark is subdivided in the spatial frequency region into regions. These regions are sectors, to each of which a value is assigned. This value is derived from the energy of the spatial frequencies which are to be found in these sectors. The stored values are associated with the category, but not with a fingermark. Therefore a comparator is utilized, which preferably provides a correlation. The values are transformed by a one-dimensional Fourier transform, in order to then perform finally the correlation by means of this transformed value. If a coincidence is determined, then the unknown fingermark is classified in a corresponding category.

SUMMARY OF THE INVENTION

Accordingly, it is an object of the present invention to provide a new method of and device for identification of a fingermark.

In keeping with these objects and with others which will become apparent hereinafter, one feature of present invention resides, briefly stated, in a method of identification of a fingermark, which comprises the steps of obtaining for a fingermark a fingermark image; storing reference fingermarks in a databank; comparing the obtained fingermark image with the reference fingermarks for identification; before the identification determining for each reference fingermark in comparison with the obtained fingermark image a similarity degree; sorting the reference fingermarks in the databank in accordance with the similarity degree; and performing the identification of the fingermark beginning with the reference fingermark which leads to the greatest similarity degree.

In accordance with another feature of present invention, a device for identification of a fingermark is provided, which has a processor; a databank; a work storage; an indicator and a fingermark sensor for determination of a fingermark image, said processor being formed so that said processor compares a fingermark image with reference marks stored in said databank to determine a similarity degree for each reference fingermark, said processor sorting the reference fingermarks in said databank in accordance with the similarity degree, said processor performing identification of the fingermark starting with the reference fingermark with a greatest similarity degree, said processor exhibiting a result of the identification with said indicator.

When the method is performed and the device is designed in accordance with the present invention, they have the advantage that an identification of a fingermark is possible. It is also advantageous that the time for the identification because of the sorting of the stored reference fingermarks in a data bank is lowered. Thereby it is possible, with a same counting time, to accept higher user numbers. The inventive method also is reliable and robust against errors. Thereby the use in the identification systems of this method is possible.

Moreover, the inventive method has the advantage that it is performed with a categorization, so that error connected with the categorization can not occur.

In accordance with a further advantageous feature of the present invention, alternatively to the details comparison, a predetermined number of details is used for identification. When this predetermined number is reached, the fingermark is considered as identified. For example, when twelve or eighteen details in the fingermark and in the reference fingermark coincide, an identification is obtained. For this purpose, preferably a threshold value can be used.

Furthermore, there is an advantage, that alternatively to the details, a correlation method for identification of the fingermark is utilized. For this purpose for example a correlation coefficient is calculated, which is compared with a predetermined threshold value. If the correlation coefficient is located above the threshold value, then the fingermark is considered as identified. Furthermore, there is an advantage that the fingermarks and the reference fingermarks are characterized by reference points (singularity), for example of core and delta points. Thereby an accurate determination of the position of the fingermark is possible: the fingermark can be placed in different positions on the fingermark sensor to generate the fingermark image, and the fingermark is determined in accordance with the reference points and/or the area around the reference point with respect to its position, and a similarity is determined in comparison with a stored fingermark.

In accordance with still a further feature of the present invention, from the fingermark, square areas around a fixedly defined point, for example a reference point (singularity) are taken and, for the analysis in the transformation performed in the frequency region, is multiplied with a rotation-symmetrical window function, for example a two-dimensional Gauss bell. Thereby in particular the corners are taken away, so that during turning always the same informations are provided in the area. Furthermore, by the comparison of the stored reference points, it is possible preferably to identify pronounced reference points in a fingermark. The area on the other hand is characterized in that, for the spatial frequency an amount and a direction are determined, in particular with the use of the power density spectrum. Therefore by means of this feature, a similarity can be determined from the comparison of the fingermark and the corresponding reference fingermark. The areas are compared, which are located at corresponding locations on the fingermark and the corresponding reference fingermark.

In accordance with a further feature of the present invention, it is advantageous that with the use of different values for the square areas it is possible to use only such areas, in which all papillar lines are to be found. This is important especially in view on the edge regions, where a square of determined value can embrace also the region outside of the fingermark and thereby finally falsify the identification.

In accordance with still a further advantageous feature of present invention, a region to be analyzed after the transformation is subdivided into the frequency region on the fingermark in sectors and rings. The sectors provide an angle determination and the power determination inside the sectors and the rings provides an expression over the frequency available in the region to be analyzed in accordance with direction and amount. The power distribution over the ring or sectors is stored in a ring vector or sector vector, which together serve as a feature vector. This feature vector is used for determination of the similarity value, in which the feature vector is compared with the feature vector of the corresponding reference fingermark. By interpolation, additional components for the feature vector can be determined.

In accordance with a further advantageous feature of present invention, by a one-dimensional Fourier transform as an integral transform of the sector vector, a comparison of turned fingermarks is facilitated. Furthermore, it is advantageous when the similarity value is determined by a difference square method or a correlation method. It is further advantageous when the area sizes on the fingermark around the corresponding utilized reference point are selected so that, only papillar lines are located in the regions as objects. Thereby a well-defined analysis and a comparison with the reference fingermarks is possible.

Finally, in accordance with a further advantageous feature of the present invention, the reference points in the fingermark image are determined by a comparison of orientation methods with stored orientation methods. This makes possible a very accurate determination of the reference points and thereby increases the accuracies of the inventive method.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a block diagram of a device for identification of fingermarks in accordance with the present invention;

FIG. 2 is a flow diagram of a method for identification of fingermarks in accordance with the present invention.

DESCRIPTION OF THE PREFERRED EMBODIMENTS

Figure 3:
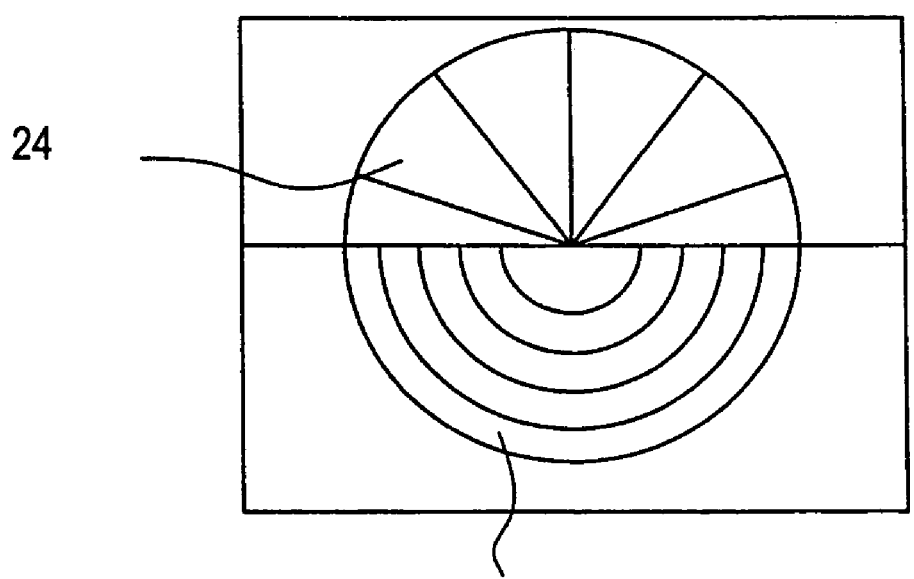
FIG. 3 is a view showing the subdivision of the region of the fingermark into rings and sectors.

Identification systems for users are utilized in various areas of life for safety reasons. In order to obtain access to automobiles, buildings and special spaces, a definite identification of the user, which only the user possesses must be guaranteed. Since only the user must have this identification feature, a body feature can be used which a user naturally always has with him. A feature which for each person is different is then fingermark. If a fingermark must be identified for example for the banking business, then the arrangement for identification of the fingermarks must have a databank with stored reference fingermarks, and the fingermark and the reference fingermarks must be systematically compared to determine a coincidence or absence of a coincidence therebetween. The method must operate fast and accurate since it is used for safety-relevant systems.

In accordance with the present invention, the reference fingermarks are sorted in the databank with the inventive arrangement in accordance with a similarity degree. This similarity degree is formed by a simple comparison of the fingermark to be identified with all reference fingermarks. For each reference fingermark a similarity degree is provided. The reference fingermarks are sorted in accordance with the value of the similarity degree, so that the fingermark with the greater similarity degree or in another words with the greater similarity with the fingermark to be identified is first compared with the fingermark to obtain an identification. This identification is then carried out with a known method for identification, or in other words a details, comparison or a correlation technique. The similarity degree is available by a comparison of properties of the area around a reference point with the properties of the stored fingermarks. A comparison of the same space of the fingermarks is performed. Corresponding areas of the stored fingermarks are utilized. This leads to a higher accuracy of the method.

FIG. 1 shows a block diagram of the inventive device for identification of fingermark. A fingermark sensor 1 is connected through a data outlet with a processor 2. A databank 3 is connected to a first data inlet/outlet of the processor 2. A work storage 4 is connected to a second data inlet/outlet of the processor 2. The signal processing unit 5 is connected to a data outlet of the processor 2. An indicator 6 is connected to a first data outlet of the signal processing unit 5. A loudspeaker 7 is connected to a second data outlet of the signal processing unit 5.

An optical system can be utilized as a fingermark sensor 1. The effect of total reflection is utilized to transform the three-dimensional data of the finger surface into a two-dimensional data quantity. A core piece is a 90° prism with a hypotenuse on which the fingertip is applied, while in one cathetus of the prism the parallel light is coupled and the brightness distribution of the other cathetus is digitalized via an CCD array and a frame digger. This is a process which is generally known as scanning. At the location, at which the raised papillar lines contact the prism surface, light is uncoupled by the local change of the refraction indices light. The arrays papillar lines are represented in the digital image as dark lines. Valleys to the contrary are represented as bright lines, since they do not disturb the total reflection. Alternatively it is possible to use a capacitor sensor. These capacitor sensors, when compared with the optical systems have the advantage of the smaller size and lower price. A capacitive sensor is composed in principle of a plurality of small capacitive individual elements which are integrated in standard CMOS technology on a chip.

Digital data are presented at the outlet of the fingermark sensor 1 and then are further processed by the processor 2. The databank 3 is here formed as a semiconductor storage. It is however also possible to use a magnetic storage, or in other words a hard disk. The work storage 4 is used for intermediate storing for the calculations. The signal processing unit 5 drives the indicator 6 or the loudspeaker 7, depending on the data which are transmitted from the processor 2 to the signal processing unit 5. If an identification of the fingermark is obtained by the processor 2, then the processor 2 of the signal processing unit 5 provides such an information which is reproduced on the indicator 6 or the loudspeaker 7. Alternatively it is possible to dispense with either the indicator 6, or the loudspeaker 7. The loudspeaker 7 has an audio amplifier and a digital/analog converter to convert the digital signals coming from the signal processing unit 5 into analog audio signals. In addition to or instead of the indicator which identifies a fingermark, it is also possible to couple an actuator with the inventive device. Such an actuator can be for example a door opener.

FIG. 2 illustrates the inventive method for identification of a fingermark as a flow diagram.

The record of the fingermark is produced in the method step 8 by the fingermark sensor 1. The fingermark image can be produced as a whole or in parts. This fingermark image is then transmitted to the processor 2. In the method step 9 the processor 2 breaks the fingermark image into regions, which are then used for the orientation estimate. The orientation estimate is important for the determination of a similarity degree. During this region selection, features are provided in order to select only such regions which have all papillar lines. This is possible by an evaluation in the frequency region, or more correctly in the power density spectrum. The property is utilized so that areas which embrace all papillar lines in a predetermined frequency region which can be determined as the typical papillar line distance have a higher spectral power density than such which have not only papillar lines as image objects. Therefore a threshold value comparison for the power density spectrum is performed. The threshold value is set so that when the measured light density is located over the threshold value it can be concluded that the searched image regions have all papillar lines.

In method step 10 a two-dimensional Fourier transform of the individual regions is performed. A Fourier transform is an integral transform. Alternatively, other types of integral transforms can be utilized. In particular, wavelets are suitable for this purpose. With wavelets, a transform with a special adjusted transform is performed.

In method step 11 then the reference points are searched in the individual regions in a space region. The regions are assembled to image regions to identify the reference points in the image regions in accordance with a comparison of orientation courses. This is performed by the comparison of orientation courses in the fingermark image and the stored orientation courses which identify the reference points. First the fingermark image is filtered in the frequency region locally with a band pass for producing a useful frequency region. Disturbances are therefore eliminated. The useful frequency region is then locally ratedly squared to compute a spectral power density for the corresponding region. The frequencies in the useful frequency region are weighted in the corresponding region with the associated spectral power density, in order to calculate with this weighted frequencies a regression straight line for the corresponding region. Thereby the orientation of the papillar lines is determined in the corresponding region. In the image regions which are assembled of several regions, then a search is performed in accordance with the reference points. The regions, as mentioned above, can be assembled to areas, and by a comparison with the stored reference orientation courses of the image regions, a corresponding reference point can be identified for an image region. Core and delta points are searched as reference points (singularities) to be identified. The reference points on a fingermark define the fingermark itself and with respect to their position, and they supply a reference points for a coordinate system.

In method step 12, square areas are placed around the reference point, for example 32×32 pixel. These square areas are provided in several sizes, since in particular at the edge region of a fingermark image a square around a reference point of a predetermined size can detect an area which does not contain papillar lines. For this purpose around each reference point a square with different predetermined sizes is provided. The square is then multiplied with a window function, here a two-dimensional Gaussing function, so that a circular cutout is produced. A circle is insensitive in particular to turnings.

In method step 13 the areas multiplied with the window function are subdivided into sectors and rings. Before the areas are two-dimensionally Fourier-transformed and then a squaring is performed to determine the power density spectrum. Since a Fourier transform is used as an integral transform, a real value signal in the frequency region has two signals which are symmetrical to an origin. Thereby a half of the power density spectrum can be used for the subdivision into rings and the other half of the power density spectrum can be used for the division in sectors.

FIG. 3 shows the division of the power density spectrum of a region with rings and sectors. Sectors 24 are provided in the upper half of the square, while the rings 25 are formed in the lower half. The sectors 24 are utilized to obtain an information or the orientations which take part in one region, while the rings are utilized to obtain an information over the frequency regions which take part in one region. The sectors 24 are circularly limited because of the window function. Since a two-dimensional Fourier transform is utilized, the frequencies have an amount and an angle which are provided as vectors.

In method step 14 the feature determination for the individual sectors 24 and the circular rings 25 is provided. For this purpose the power of the individual frequencies in the sectors or rings is summed for the corresponding sectors and rings, so that for the sectors the sum of the power of the individual frequencies provides a degree for the corresponding orientation, while for the rings the sum of the frequencies provides a degree for the corresponding amount. This gives corresponding components a sector—or ring vector. Alternatively, by means of an interpolation the number of the rings and sectors can be subsequently increased. This can be required in particular for an adaptation of the data sets. The ring vector and the sector vector together form the basic shape of the papillar line course in a corresponding area.

The basic idea is that two areas which contain substantially the same image information must also have substantially coinciding portions with the orientation and frequency portions occurring in the cutout, or in other words the sector and the ring components. For the ring components this is true independently from a turning of the both finger marks, since by integration over all contributing angles, these ring components are calculated.

The sector vectors are first not rotation-independent. Because of the rotation property of the Fourier transform, during a rotation of the image cutout a cyclical displacement of the sector components is performed, since the spectrum of a turned region also turns. Since sector vector deals with a cyclical or periodic feature vector, with which the first and the last value transit into one another, this feature vector before the later comparison is transformed into the one-dimensional frequency region. Thereby a feature vector is obtained, which is independent from the turning angle. Also the ring vector is Fourier transformed in accordance with the inventive method. This is performed in the method step 15. Instead of the Fourier transform as the integral transform, also other types of integral transforms can be used, in particular the wavelets.

In method step 16 a comparison of the Fourier-transformed ring vectors and the Fourier-transformed sector vectors of the fingermark to be identified and the corresponding reference fingermark is performed. The comparison takes place for vectors which are produced for a corresponding space on the fingermark and the corresponding reference fingermark. In addition, also a comparison of the non-transformed ring vectors or sector vectors is performed. The comparisons take place at the same spaces on the fingermark and on the corresponding reference fingermark. Thereby four comparisons are performed. In the method steps 17, from these four comparisons or in other words the four similarity degrees, a similarity degree is determined by binding (linking). This is performed either by a weighted addition or by a multiplication.

In the method step 18, with the similarity degrees for the corresponding reference fingermark, a sorting of the data bank 3 in accordance with the magnitude of the similarity degree is performed by the processor 2. The reference fingermark with the greatest similarity degree is located at the first place.

In the method step 19, starting with the reference fingermark which has the greatest similarity degree, the identification is performed. It has performed by means of a detail comparison. A predetermined number of details is taken as a presumption for an identification. For example, twelve details of the fingermark and the reference fingermark must coincide, so that one can speak about an identification. Details means local features which are identified by individual papillar lines. Papillar lines are for example the skin grooves on the inner hand surface.

Alternatively it is possible to calculate a correlation coefficient by correlation of the fingermark with the reference fingermark, and compare it with a predetermined threshold value. If the correlation coefficient is located above the threshold value, then an identification is indicated. If it is located below, there is no identification. In method step 20 it is verified whether an identification is provided. If this is the case, in method step 21 by means of the indicator 6 or the loudspeaker 7 it is indicated that the fingermark is identified and in some cases a data set bound with the reference fingermark is brought for identification. This can involve for example a person, such as a name or an image of the person. Alternatively, also the activation of an actuator is also possible, for example for opening a door.

If in method step 20 it is determined that no identification takes place, then in method step 22 it is evaluated whether the data bank was completely searched. If this is not the case, then in method step 19 the process continues with the next reference fingermark in the data bank. If in method step 22 it is however determined that the data bank is completely searched, then in method step 23 it is indicated that the presented fingermark is not identifiable.

It will be understood that each of the elements described above, or two or more together, may also find a useful application in other types of methods and constructions differing from the types described above.

While the invention has been illustrated and described as embodied in a method of and device for identification of fingermarks, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of identification of a fingermark, comprising obtaining for a fingermark a fingermark image; storing reference fingermarks in a databank; comparing the obtained fingermark image with the reference fingermarks for identification; before the identification determining for each reference fingermark in comparison with the obtained fingermark image a similarity degree; sorting the reference fingermarks in the databank in accordance with the similarity degree; and performing the identification of the fingermark beginning with the reference fingermark which leads to a greatest similarity degree; and placing square areas around a reference point of the obtained fingermark; multiplying the area with window function; transforming the area by means of a first integral transform in a space frequency region; determining features in the areas of the reference point; evaluating for the features the space frequencies in accordance with amount and direction; and determining by the features of the obtained fingermark and the reference fingermark correspondingly the similarity degree for the corresponding reference fingermark.

2. A method as defined in claim 1; and further comprising laying the square areas in different sizes.

3. A method as defined in claim 1, and further comprising breaking a power density spectrum of the areas of the reference points in sectors and rings; summing for the sectors and the ring the powers of the corresponding containing space frequencies so that for the sectors a degree for the orientation is provided and for the rings a degree for the amount; forming thereby a ring vector and a sector vector; forming the ring vector and the sector vector as a feature vector; and comparing with a feature vector of the reference finger marks to determine the similarity degree.

4. A method as defined in claim 3; and further comprising joining the comparison of the ring vector and the sector vectors before ard after a second integral transform to the similarity degree for the corresponding reference fingermark.

5. A method as defined in claim 4; and further comprising performing the comparison by a method selected from the group consisting of a difference square method and a correlation method.

6. A method as defined in claim 3; and further comprising comparing the ring vector with the sector vector before and after each second integral transformation with the corresponding ring vector and the sector vector of the corresponding reference finger mark, to determine the similarity for the corresponding reference fingermark.

* * * * *